April 23, 1968 P. J. PERKINS, JR 3,379,330
CRYOGENIC INSULATION SYSTEM
Filed Dec. 8, 1965

INVENTOR
PORTER J. PERKINS JR.
BY G. T. McCoy
Gene E. Shook
ATTORNEYS

United States Patent Office 3,379,330
Patented Apr. 23, 1968

3,379,330
CRYOGENIC INSULATION SYSTEM
Porter J. Perkins, Jr., Rocky River, Ohio, assignor to the United States of America as represented by the Administrator of the National Aeronautics and Space Administration
Filed Dec. 8, 1965, Ser. No. 512,559
8 Claims. (Cl. 220—9)

ABSTRACT OF THE DISCLOSURE

Cryogenic insulation in the form of panels that are self-evacuated at the time of use to provide the required quality of insulation. Prefabricated insulation panels comprising multilayers of shields and separators enclosed in a vacuum-tight flexible casing that contains a gas having a low vapor pressure at cryogenic temperatures are secured to the outer surface of a tank containing a cryogen.

---

The invention described herein may be manufactured and used by or for the Government of the United States of America for governmental purposes without the payment of any royalties thereon or therefor.

This invention relates to the insulation of a cryogenic storage container. The invention is particularly concerned with self-evacuated multilayer insulation of lightweight prefabricated panels for a tank containing a cryogenic rocket propellant, such as liquid hydrogen.

Liquid hydrogen is a desirable propellant for chemical and nuclear rockets because of its high theoretical performance. High boil-off losses in liquid hydrogen storage tanks present a difficult insulation problem. These losses are caused by the very low boiling temperature, −423° F., for this propellant as well as its low density which results in a large tank surface area.

Previous methods and devices for insulating liquid hydrogen tanks for flight vehicles have been feasible only for booster-type rocket vehicles where storage time in the tanks is of relatively short duration. These insulation systems would not provide the thermal protection required for liquid hydrogen fuel in space propulsion stages where storage time is several days.

Multilayer insulations have been proposed for space vehicles because the high vacuum environment required for these insulations makes them ideal for space applications. However, thermal protection for cryogenic propellants in space vehicles must also include protection for a relatively short period while the vehicle is on the ground and during boost through the atmosphere. The conventional double-walled vacuum-jacketed dewar normally used to achieve high vacuums around a tank is too heavy to use on propellant tanks of space propulsion vehicles. For practical use on flight vehicles, the heavy outside wall must be replaced by a lightweight vacuum casing. Lightweight films which could be used for such a casing are not completely impermeable and therefore can be expected to hold high vacuum only for a relatively short period of time. Also, any insulation system must be readily adaptable to relatively large size propellant tanks.

The insulation system of the present invention utilizes multilayers of shields and separators that are enclosed in a vacuum-tight flexible casing that is self-evacuated at the time of use to provide the required quality of insulation. The insulation is in the form of prefabricated insulation panels which are particularly useful with the large size tanks required for storing liquid hydrogen. An atmosphere of gaseous carbon dioxide or a similar gas having a very low vapor pressure at cryogenic temperatures, is under a slight positive pressure at ambient temperature within the sealed insulation panels. The required low vacuum within the panels, necessary for multilayer systems, is created only when the panels are attached to the propellant tank and the walls of the tank are cooled by the presence of a cryogen in the tank.

It is, therefore, an object of the present invention to provide an improved lightweight multilayer insulation system for a cryogenic container that is prefabricated in multiple panels thereby insuring system reliability.

Another object of the invention is to provide a cryogenic insulation system which utilizes sealed panels containing alternate layers of heat reflective shields and separators within a vacuum environment thereby achieving low heat transfer with low weight.

A still further object of the invention is to provide a cryogenic insulation system which utilizes alternate layers of heat reflective shields and separators which are sealed within a vacuum-tight flexible casing that is self-evacuated at the time of use.

These and other objects of the invention will be apparent from the specification which follows and from the drawings wherein like numerals are used throughout to identify like parts.

Figure 1:
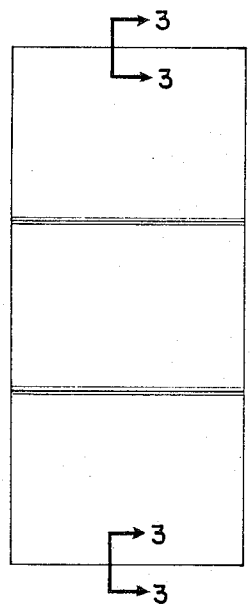
FIG. 1 is an elevation view of a lightweight insulation panel prefabricated in accordance with the present invention.
Figure 2:
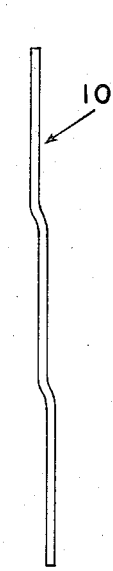
FIG. 2 is a side view of the panel shown in FIG. 1.
Figure 3:
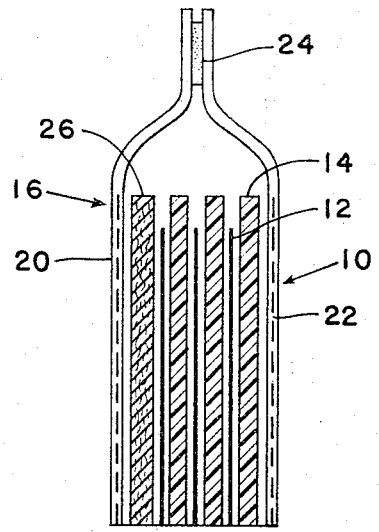
FIG. 3 is an enlarged section view taken along the line 3—3 in FIG. 1.

The drawing illustrates the construction and use of a self-evacuated insulation system comprising lightweight prefabricated panels 10 embodying the features of the present invention. As shown in FIG. 3, each panel 10 comprises alternate layers of heat reflective shields 12 and separators 14 sealed within a vacuum-tight casing 16 of a lightweight flexible material. The panels 10 are mounted on a cryogenic storage tank 18 shown in FIG. 4 in a manner which will be described later in greater detail.

Each heat reflective shield 12 comprises a layer of polyester plastic that has been aluminized on both surfaces with films of vapor deposited aluminum. A one-quarter mil Mylar film has been a satisfactory heat reflective shield.

Each separator 14 comprises a layer of lightweight plastic foam having a low heat flux. Polyurethane foam having a density of two pounds per cubic foot sliced to a thickness of less than 0.020 inch has been a satisfactory separator.

The vacuum-tight casing 16 comprises an inner sealing cover 20 on the cold side of the panel 10 which faces the tank 18 and an outer sealing cover 22 on the warm side of the panel. Each of the covers 20 and 22 comprises a 4-ply laminate of a polyester plastic aluminized on both sides. One-half mil Mylar having a vapor deposited film of aluminum on each surface has been satisfactory for the plies of the laminate.

Inasmuch as the insulation vacuum is required for only a relatively short period of time, some permeability of the vacuum casing 16 can be tolerated. However, for optimum sealing it is contemplated that other laminates comprising at least one layer of a plastic film and at least one layer of a thin metal foil may be used. For example, a Mylar-aluminum-aluminum-Mylar laminate, known as MAAM and described in a copending application Serial No. 505,765 entitled "Filament-Wound Container and Method of Making the Same," filed Oct. 29, 1965, may be used for the covers 20 and 22. Another laminate, designated as MAM and described in copending application Serial No. 430,226 filed Feb. 3, 1965, is likewise a suitable material for the casing 16.

The contacting edges of the sealing covers 20 and 22 are sealed to form the vacuum-tight casing 16. An adhesive bond 24 is placed between marginal surface portions of the covers 20 and 22 as shown in FIG. 3.

An important feature of the invention is the inclusion of a condensible gas, such as purified carbon dioxide, within the vacuum casing 16. The panel 10 is initially charged with this gas during fabrication.

By the process of cryopumping, the condensing gas solidifies at the inner sealing cover 20 which is adjacent the cold surface of the cryogenic tank 18 thereby evacuating the panel 10. This self-evacuating feature occurs when the tank 18 is cooled down during filling with the cryogen.

To prevent the solid carbon dioxide frost condensed on the inner cover 20 from falling off under vibrations and re-evaporating thereby temporarily destroying the vacuum, a porous substrate 26, such as a layer of fiberglass mat, is interposed between the inner surface of the cover 20 and the adjacent heat reflective shield 12. It is also contemplated that a layer of plastic foam may be used for the porous substrate 26.

The flow of carbon dioxide to the inner cover 20 may be enhanced by perforating the heat reflective shields 12. Inasmuch as the thickness of the film of condensed gas on the inner cover 20 is normally quite small, the porous substrate 26 may not be required in applications where high vibrations are not encountered.

Figure 4:
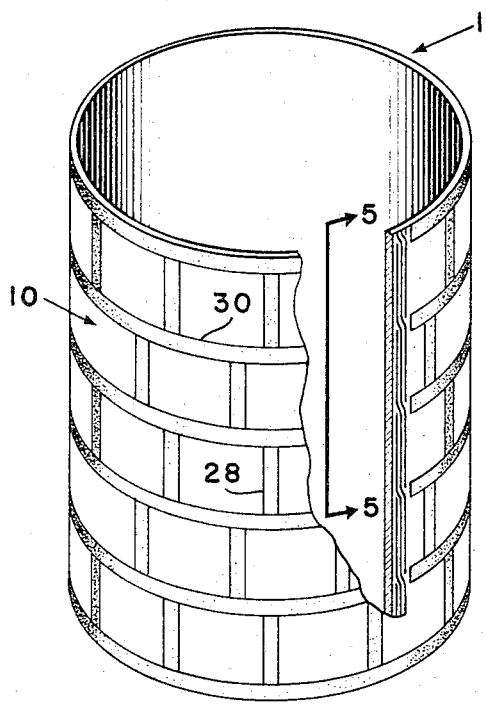
FIG. 4 shows a cryogenic storage container with parts broken away insulated in accordance with the present invention utilizing panels of the type shown in FIG. 1.
Figure 5:
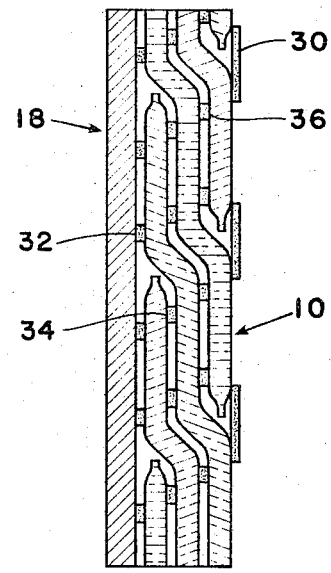
FIG. 5 is an enlarged section view taken along the line 5—5 in FIG. 4.

Referring to FIG. 4 the panels 10 are mounted on the tank 18 in a shingle arrangement of attachment with adjacent rows of overlapping panels. As shown in FIG. 5, one-third of each panel 10 is exposed to the outside temperature; one-third of this panel is attached to the cold tank wall; and one-third is between adjacent panels. Panels 10 having a width of two feet and a length of six feet have been used successfully to insulate a liquid hydrogen storage tank. With these panels, only a portion measuring two feet by two feet is exposed to the atmosphere.

The thickness of each panel 10 is kept to a minimum to reduce the forming and wrinkling of the sealing covers 20 and 22 as well as to provide as much flexibility as possible for the overlapped areas. An overall thickness of 0.10 inch was found to be satisfactory for the two feet by six feet panels. The four-ply laminate of aluminized Mylar is preferred over the other casing materials for the sealing covers 20 and 22 because it does not tend to wrinkle and form as much as the other materials.

The panels are arranged in each row to bridge the butt joints of the panels in the row underneath to reduce the heat leak through the unavoidable heat short that exists along the edges of each panel. Vertical strips 28 of sealing material overlap the butt joints between the panels 10 to seal the space between the panels when they are mounted on the tank 18. Horizontal strips 30 of similar sealing material overlap the lower edge of each panel and the adjacent panel.

A portion comprising the upper third of each panel 10 is secured to the outer surface of the tank 18 by an adhesive grid 32. A similar adhesive grid 34 secures the center third portion of each panel to the upper third portion of the adjacent panel secured to the tank 18. Still another adhesive grid 36 secures the lower third portion of each panel 10 to the center third portion of the underlying panel. The adhesive grids 32, 34, and 36 are in the form of glue lines and add structural rigidity to the panels 10 assembled on the tank 18.

While a preferred embodiment of the invention has been shown and described, it will be appreciated that various modifications may be made to the disclosed structure without departing from the spirit of the invention or the scope of the subjoined claims.

What is claimed is:

1. A lightweight insulation system for a storage tank containing cryogenic fluid comprising
    a plurality of insulating panels (of insulating material) arranged about the outer surface of the tank in overlapping array with a portion of each panel in contact with said outer surface,
    each of said panels comprising multilayers of shields and separators enclosed in a vacuum-tight casing filled with a gas having a low vapor pressure at cryogenic temperatures whereby a vacuum is created within the panel when the tank wall is contacted by the cryogenic fluid, and
    means for maintaining said panels in contact with the tank.

2. A lightweight insulation system as claimed in claim 1 wherein about one-third of each panel is in contact with the tank and one-third of each panel is exposed.

3. A lightweight insulation system as claimed in claim 1 wherein the panels are arranged in rows with each row bridging the butt joints of the panels in the row underneath thereby reducing the heat leakage through the heat short that exists along the edges of each panel.

4. An insulating panel comprising
    a plurality of heat reflective layers,
    a plurality of separating layers interposed between said heat reflective layers,
    a vacuum-tight casing for covering said heat reflective layers and said separating layers, and
    a condensible gas having a low vapor pressure within said casing to create a vacuum therein by cryopumping when the panel is exposed to a cryogen.

5. An insulating panel as claimed in claim 4 wherein each of the separating layers consists of a layer of a lightweight plastic foam.

6. An insulating panel as claimed in claim 5 wherein each of the separating layers consists of a layer of polyurethane foam having a density of about two pounds per cubic foot.

7. An insulating panel comprising,
    a plurality of heat reflective layers,
    a plurality of separating layers interposed between said heat reflective layers,
    a vacuum-tight casing covering said heat reflective layers and said separating layers,
    a condensible gas within said casing to create a vacuum therein by cryopumping when the panel is exposed to a cryogen, and
    a layer of porous material adjacent one surface of said casing for collecting the condensed gas thereby inhibiting the re-evaporation of the same when the panel is vibrated.

8. An insulating panel as claimed in claim 7 wherein the porous material comprises a layer of fiberglass mat.

References Cited

UNITED STATES PATENTS 3,009,601 11/1961 Matsch _____ 220—9
3,208,621 9/1965 Dawson _____ 220—9

THERON E. CONDON, *Primary Examiner.*

JAMES B. MARBERT, *Examiner.*